United States Patent
Jagannatharao et al.

(10) Patent No.: US 8,612,606 B2
(45) Date of Patent: Dec. 17, 2013

(54) PRESERVING AN AUTHENTICATION STATE BY MAINTAINING A VIRTUAL LOCAL AREA NETWORK (VLAN) ASSOCIATION

(75) Inventors: Manjunath Jagannatharao, San Jose, CA (US); Sachin Bansal, Fremont, CA (US); Lisa Guo, Los Altos, CA (US); Nagendra K S, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 521 days.

(21) Appl. No.: 12/902,682

(22) Filed: Oct. 12, 2010

(65) Prior Publication Data

US 2012/0089742 A1    Apr. 12, 2012

(51) Int. Cl.
*G06F 15/16*          (2006.01)
*G06F 15/173*        (2006.01)

(52) U.S. Cl.
USPC .......................................... 709/227; 709/225

(58) Field of Classification Search
USPC ................... 709/225, 227, 228, 230
See application file for complete search history.

(56) References Cited

U.S. PATENT DOCUMENTS

| | | | | |
|---|---|---|---|---|
| 8,341,717 B1 * | 12/2012 | Delker et al. | ................... | 726/10 |
| 2003/0217122 A1 * | 11/2003 | Roese et al. | ................... | 709/219 |
| 2004/0177276 A1 * | 9/2004 | MacKinnon et al. | ......... | 713/201 |
| 2008/0130601 A1 * | 6/2008 | Kim et al. | ..................... | 370/338 |
| 2009/0089431 A1 * | 4/2009 | Kim et al. | ..................... | 709/226 |
| 2011/0268127 A1 * | 11/2011 | Dhar et al. | ..................... | 370/401 |

OTHER PUBLICATIONS

The Institute of Electrical and Electronics Engineers, Inc., "IEEE Standard for Local and Metropolitan Area Network—Port-Based Network Access Control", IEEE Std 802.1X-2001, Jun. 14, 2001, 142 pages.

* cited by examiner

*Primary Examiner* — Brian J Gillis
(74) *Attorney, Agent, or Firm* — Harrity & Harrity, LLP

(57) ABSTRACT

A method may include detecting a presence of a first server device; communicating, with the first server device, to obtain information associated with the first server device; sending, to a second server device, a request for authentication services, where the request includes the information associated with the first server device; receiving, from the second server device, a notification that the first server device has been authenticated, where the notification includes a session threshold; and establishing, based on the notification, a session with the first server device by associating the first server device with a virtual local area network (VLAN), where the associating permits network traffic to be received from or sent to the first server device via the VLAN, and where the network node uses the session threshold received from the second server device, instead of a threshold associated with the VLAN, to determine a duration permitted for the session.

21 Claims, 6 Drawing Sheets

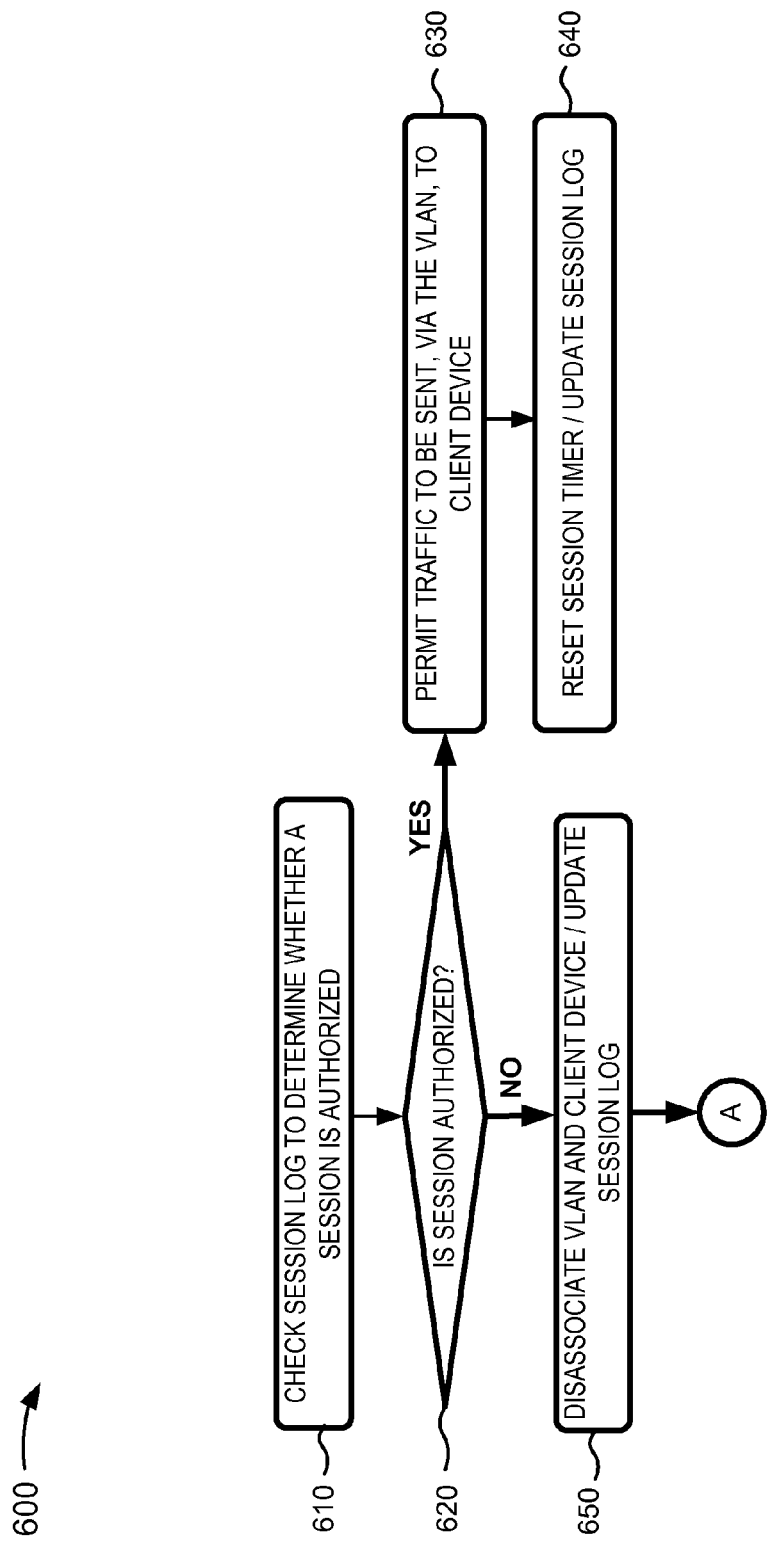

PRESERVING AN AUTHENTICATION STATE BY MAINTAINING A VIRTUAL LOCAL AREA NETWORK (VLAN) ASSOCIATION

BACKGROUND

Computing and communication networks typically include network devices, such as routers, firewalls, switches or gateways, which transfer or switch data, such as packets, from one or more sources to one or more destinations. Network devices may operate on the packets as the packets traverse the network, such as by forwarding or filtering the packet-based network traffic. Packets may be temporarily stored in queues as packets are moved through the network devices.

Network devices may use virtual local area networks (VLANs) to forward packets to a destination device. The network device may authenticate the destination device (e.g., using an identifier associated with the destination device) and may associate and/or "bind" the destination device to a particular VLAN configured on the network device. When the network device receives packets destined for the destination device, the network device may forward the packet to the destination device via the particular VLAN. Unfortunately, when the destination device remains inactive for a period of time (e.g., that is greater than a threshold), the authentication of the destination device may expire. The expired authentication may cause the network device to disassociate and/or unbind the destination device from the particular VLAN, which may render the network device unable to send the packets to the destination device.

SUMMARY

According to one aspect, a method may be performed by a network node. The method may include detecting, by the network node, a presence of a first server device on a network associated with the network node; communicating, by the network node and with the first server device, to obtain information associated with the first server device; and sending, by the network node and to a second server device, a request for authentication services, where the request may include the information associated with the first server device. The method may also include receiving, by the network node and from the second server device, a notification that the first server device has been authenticated, where the notification may include a session threshold associated with the authentication; and establishing, by the network node and based on the notification, a session with the first server device by associating the first server device with a virtual local area network (VLAN), hosted by the network node. The associating may permit network traffic to be received from or sent to the first server device via the VLAN and the network node may use the session threshold, instead of a threshold associated with the VLAN, to determine a duration permitted for the session.

According to another aspect, a network node may include a memory to store a session log associated with a collection of VLANs hosted by the network node. The network node may also include a processor to determine that a session with a client device is not authorized when a duration that the client device is inactive is greater than a session threshold; perform an authentication operation on the client device based on communications with a server device and information associated with the client device; and send a notification to the client device that another session is not authorized when the authentication operation cannot authenticate the client device. The processor may also authorize the other session with the client device when the authentication operation can authenticate the client device, where the authorizing may include associating the client device with a VLAN of the collection of VLANs, and storing, in the session log, at least one of the information associated with client device, information associated with the VLAN, or another session threshold obtained, from the server device, as a result of the authentication operation, and where the other session threshold is used to authorize the other session instead of a threshold embedded in hardware or software associated with the network node.

According to still another aspect, a method may include receiving, by a network node and from a host device, traffic destined for a client device; checking, by the network node, a session log associated with a VLAN, hosted by the network node, to determine whether a session with the client device is authorized; and sending, by the network node and via the VLAN, the network traffic to the client device based on a determination that the session with the client device is authorized. The method may also include disassociating, by the network node, the client device and the VLAN based on a determination that the session with the client device is not authorized, where the disassociating renders the network node unable to send the traffic to the client device; communicating, by the network node and with an authentication server, to re-authenticate the client device based on information associated with the client device; and establishing, by the network node and based on the communicating, another session with the client device by associating the client device with the VLAN, where the associating may not be based on a predetermined time period associated with embedded software or hardware within the network node, and where the associating may be for a period of time that corresponds to a session threshold obtained, from the authentication server, as a result of the communicating.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 6 is a flow chart of an example process for processing traffic based on whether an association between a VLAN and client device is to be maintained.

DETAILED DESCRIPTION

Figure 1:
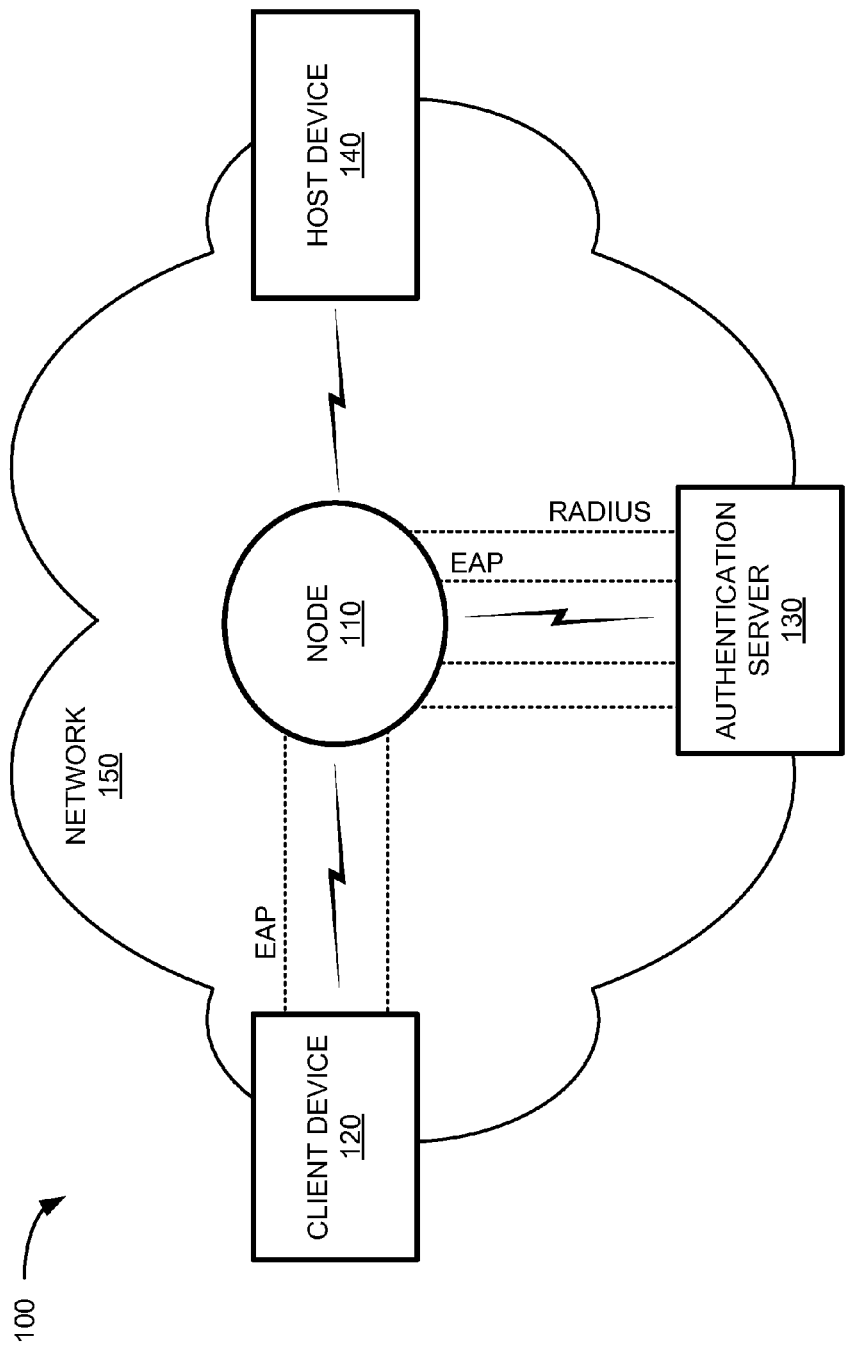
FIG. 1 is a diagram of an example network in which systems and/or methods described herein may be implemented.

The following detailed description refers to the accompanying drawings. The same reference numbers in different drawings may identify the same or similar elements. Also, the following detailed description does not limit the invention.

Systems and/or methods described herein may preserve an authenticated session with a client device by maintaining an association between a virtual local area network (VLAN), hosted by a network node, and the client device with which the network node is interconnected.

As described herein, an authenticator application may cause a VLAN-client device association to be maintained even though a client device (e.g., such as a printer, a scanner, a laptop computer, etc.) has been idle and/or inactive for a period of time that exceeds a threshold, such as a forwarding database (fdb) entry threshold (hereinafter referred to as an "fdb threshold"). The fdb threshold is usually implemented, as hardware, within a component associated with the network node and/or as software (e.g., as part of an operating system, background daemon, etc.) hosted by a network node. Maintaining the VLAN-client device association, after the fdb threshold has timed out, may permit the network node to continue a session with the client device even when the client device has been inactive for a period of time that is greater than the fdb threshold.

As also described herein, the authenticator application may use a session threshold (e.g., instead of the fdb threshold) to determine whether a session has expired. The authenticator application may communicate with an authentication server to authenticate the client device and may receive a session threshold from the authentication server that performs the authentication. Generally, the session threshold may be greater than the fdb threshold. The authenticator application may use the session threshold to determine when the session with the client device has timed out and/or when to terminate the VLAN-client device association. For example, when the client device remains inactive for a period of time that is greater than the fdb threshold, the authenticator application may maintain the VLAN-client device association, which permits the session with the client device to continue. When the client device remains inactive for a period of time that exceeds the session threshold, the authenticator application may end the session with the client device by terminating the VLAN-client device association. The session with the client device may be reinitiated when the authenticator application communicates with the authentication server to re-authenticate the client device.

The term "VLAN," as used herein, may include attributes that are the same or similar to a physical local area network (LAN) that enables client devices and/or other devices to be grouped together to interact and/or receive a common set of services (e.g., security, network management, communications, traffic flow management, etc.) regardless of physical locations at which the client devices are connected. For example, a network node may include a VLAN (e.g., a printer VLAN) that permits network traffic to be sent to one or more client devices that are printers and/or provide printing services. Unlike a physical LAN, however, a VLAN may not be directly tied to specific hardware and/or may share bandwidth, transport, and/or processing capacity/resources associated with the underlying network.

FIG. 1 is a diagram of an example system 100 in which systems and/or methods described herein may be implemented. As shown in FIG. 1, system 100 may include a network node 110 (hereinafter referred to collectively as "nodes 110" and individually as "node 110"), a client device 120, an authentication server 130, and a host device 140 that are interconnected by network 150. The number of networks and/or devices, illustrated in FIG. 1, is provided for explanatory purposes only. In practice, there may be additional networks and/or devices, fewer networks and/or devices, different networks and/or devices, or differently arranged networks and/or devices than illustrated in FIG. 1. Also, in some implementations, one or more of the devices of system 100 may perform one or more functions described as being performed by another one or more of the devices of system 100. Components of system 100 may interconnect via wired connections, wireless connections, or a combination of wired and wireless connections.

Node 110 may include a network device that transmits data traffic. For example, node 110 may take the form of a routing device, a switching device, a multiplexing device, or a device that performs a combination of routing, switching, and/or multiplexing functions. In one implementation, node 110 may be a digital device. In another implementation, node 110 may be an optical device. In yet another implementation, node 110 may be a combination of a digital device and an optical device.

Node 110 may include an internal or external storage device and/or memory that stores information associated with node 110 operations. In one example, node 110 may store, in the storage device and/or memory, network topology information, routing tables, packet forwarding tables, and/or multicast forwarding tables. In another example, node 110 may store, in the storage device and/or memory, information associated with VLAN configurations (e.g., identifiers, port assignments, associated MAC addresses, etc.).

Node 110 may act as an edge device and may generally function to connect authentication server 130, host device 140 and/or client device 120 to network 150. Node 110 may act as a core device and may function to transmit traffic between other nodes 110 (not shown in FIG. 1) within network 150. Node 110 may add (push) and/or remove (pop) information (e.g., headers, trailers, tags, etc.) from incoming and/or outgoing packets. In another implementation, nodes 210 may perform multicast operations. For example, node 110 may host a VLAN, or set of VLANs, that may be used to receive, process, and/or transmit traffic to and/or from client device 120, authentication server 130, host device 140, and/or other nodes 110.

Node 110 may host an authenticator application to perform authentication functions when interacting with authentication server 130 and/or client device 120 (e.g., as a supplicant). In one example implementation, the authenticator application may execute authentication protocols based on the Institute of Electrical and Electronics Engineers (IEEE) 802.1X authentication protocol (sometimes referred to as "dot1X"). Node 110 may detect client device 120 on network 150 and may communicate with client device 120 to initiation an authentication operation. In one example, node 110 may communicate with client device 120 using an extensible authentication protocol (e.g., EAP or EAP over a local area network (EAPOL)).

Node 110 may receive information associated with client device 120 (e.g., a MAC address, an IP address, a device identifier, etc.) and may communicate with authentication server 130 in order to receive authentication services. In one example, node 110 may communicate with authentication server 130 using an EAP protocol. In another example, node 110 may communicate with authentication server 130 using a remote authentication dial-in user service (RADIUS) protocol. In yet another example, node 110 may communicate with authentication server 130 using EAP and RADIUS protocols.

Node 110 may receive an authentication notification from authentication server 130 and may initiate a session with client 120 by associating client device 120 with a particular VLAN hosted on node 110. In one example, if client device 120 is a passive device (e.g., generally using one-way communication, such as a printer, an appliance, etc.), then node 110 may associate client device 120 to a VLAN, associated with the passive device (e.g., a printer-VLAN), via which node 110 may send packets to, or receive packets from, client device 120 while the session is in an authenticated state. Node 110 may obtain a session threshold from authentication server 130 (e.g., that was included in the authentication notification received from authentication server 130). Node 110 may use the session threshold to determine whether to re-authenticate client device 120. For example, if client device 120 remains in an inactive and/or idle state for a period of time that exceeds the session threshold, then node 110 may terminate the association between the printer-VLAN and client device 120. Terminating the association may render node 110 unable to send packets to and/or receive packets from client device 120 until and/or unless client device 120 is re-authenticated.

Client device 120 may include any device that performs a function, provides a service, and/or is capable of communicating with network 150. In one example implementation, client device 120 may take the form of a printer device, although the systems and/or methods herein may be implemented in another type of client device 120. For example, client device 120 may include a computer system (e.g., that includes a router, a server device, a workstation, a computer device, etc.), a telephone system (e.g., landline telephones, a private branch exchange (PBX), etc.), a wireless telephone, a set top box (STB), a television, a close capture television (CCTV) system, a camera, a personal gaming system, an appliance (e.g., a refrigerator, a stove, a vending machine, etc.). In another example, client device 120 may be a smart grid device, such as a power generation device, a thermostat, a sensor (e.g., a motion detector, a door sensor/alarm, a smoke detector, etc.), an air handler, an HVAC system, a building security system, a fire detection/alarm/suppression system, a thermometer, a device to measure humidity (e.g., a psychrometer, a hygrometer, etc.), a light and/or lighting system, a power panel, etc. The devices described above may include passive devices that generally engage in one-way communications and/or active devices that generally engage in two-way communications.

Client device 120 may send packets to and/or receive packets from node 110. Client device 120 may send authentication requests to node 110 and/or respond to authentication requests receive from node 110. Client device 120 may act as a supplicant when engaged in authentication operations with node 110 and may, for example, communicate with node 110 using an EAP protocol when engaged in authentication operations.

Authentication server 130 may include one or more server devices, or other types of computation or communication devices, that gather, process, search, store, and/or provide information in a manner similar to that described herein. In one example implementation, authentication server 130 may perform authentication operations on behalf of node 110. In one example, authentication server 130 may be capable of communicating with node 110 using an EAP protocol and/or a RADIUS protocol when performing authentication operations. Authentication server 130 may, for example, receive a request (e.g., from node 110) to authenticate client device 120 and may compare information associated with client device 120, receive in the request, to information associated with client device 120 stored in a memory associated with authentication server 130 to determine whether the received information matches the stored information. Based on the comparison, authentication server 130 may send a notification to node 110 indicating whether or not client device 120 could be authenticated. For example, if the received information matches the stored information, authentication server 130 may send a notification to node 110 indicating that client device 120 is authenticated.

Additionally, or alternatively, authentication server 130 may send a session threshold associated with client device 120, which may be used by node 110. In one example, the session threshold may be predetermined via software and/or hardware associated with authentication server 130. In another example, the session threshold may be set by a network administrator. In one example implementation, the session threshold may be generated based on a 32-bit value, associated with the dot1X protocol, that permits session thresholds to up to 132 years.

In one example, the session threshold may be set such that the session threshold is greater than an fdb threshold associated with node 110. In another example, a session threshold may be specified based on a type of client device 120. For example, if client device 120 is a particular type of passive device (e.g. a printer) that is generally expected to be inactive for a particular period of time, then the session threshold for the printer may be set, such that the session threshold is greater than the particular period of time. In another example, the session threshold may be set based on a time of day, a day of the week, a time of year, etc. that may permit, for example, a session threshold for working hours and/or an another session threshold for non-working hours.

Host device 140 may include any computation or communication device, such as a wireless mobile communication device that is capable of communicating via network 150. For example, host device 140 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a landline telephone, a STB, a television, a camera, a personal gaming system, or another type of computation or communication device. In another implementation, host device 140 may be a server device that may gather, process, search, store, and/or provide information in a manner similar to that described herein.

Host device 140 may communicate with client device 120, via one or more nodes 110 to receive services and/or information. For example, host device 110 may be a laptop computer and may request to client device 120 to receive printing services. In another example, host device 140 may send instructions to client device 120 that cause client device 120 to perform some act (e.g., to power up, to perform an operation, etc.). In the above examples, host device 140 may send packets to node 110 that include an address (e.g., an Internet protocol (IP) address, a media access code (MAC) address, etc.) associated with the client device 120. Client device 120 may process the packets based on the address (e.g., using a VLAN associated with the address obtained from the packets) in order to forward the packets to client device 120.

Network 150 may include one or more wired and/or wireless networks. For example, network 250 may include a cellular network, a public land mobile network (PLMN), a second generation (2G) network, a third generation (3G) network, a fourth generation (4G) network (e.g., a long term evolution (LTE) network), a fifth generation (5G) network, and/or another network. Additionally, or alternatively, network 250 may include a wide area network (WAN), a metropolitan network (MAN), a telephone network (e.g., the Public Switched Telephone Network (PSTN)), an ad hoc network, an intranet, the Internet, a fiber optic-based network (e.g., a FiOS network), and/or a combination of these or other types of networks.

Figure 2:
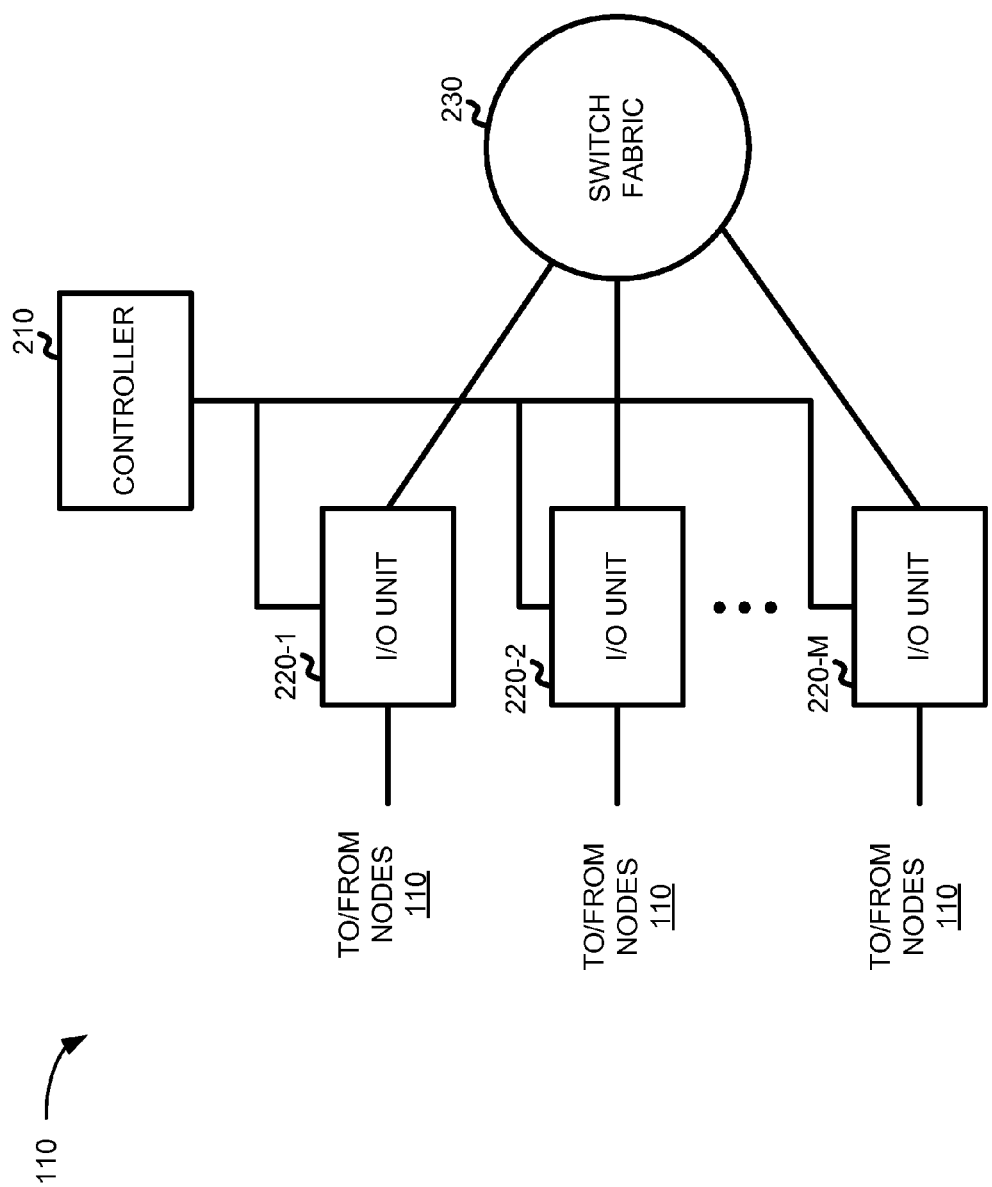
FIG. 2 is a diagram of example components of the network node of FIG. 1.

FIG. 2 is a diagram of example components of the node 110 of FIG. 1. In this example implementation, node 110 may take the form of a router, although the systems and/or methods herein may be implemented in another type of network device. For example, node 110 may include another data transfer device, such as a gateway, a switch, a firewall, a network interface card (NIC), a hub, a bridge, a proxy server, an optical add-drop multiplexer (OADM), or some other type of device that processes and/or transfers traffic.

Node 110 may receive network traffic, as one or more packet stream(s), from physical links, may process the packet stream(s) to determine destination information, and may transmit the packet stream(s) out on links in accordance with the destination information. Node 110 may include a controller 210, a set of input/output (I/O) units 220-1, 220-2, . . . , 220-M (where M≥1) (hereinafter referred to collectively as "I/O units 220" and individually as "I/O unit 220"), and a switch fabric 230.

Controller 210 may include a processor, a microprocessor, or some form of hardware logic (e.g., an application specific integrated circuit (ASIC) or a field programmable gate array (FPGA)). In one example implementation, controller 210 may include an Ethernet controller and/or another controller device. Controller 210 may perform high level management functions for node 110. For example, controller 210 may maintain the connectivity and manage information/data necessary for transferring packets by node 110. Controller 210 may create routing tables based on network topology information, create forwarding tables based on the routing tables, and communicate the forwarding tables to I/O units 220. I/O units 220 may use the forwarding tables to perform route lookup for incoming packets and perform the forwarding functions for node 110. Controller 210 may also perform other general control and monitoring functions for node 110.

Controller 210 may generate session logs to track and/or monitor sessions with devices with which node 110 communicates. For example, controller 210 may host an authenticator application that performs authentication operations associated with client device 120, authentication server 130, and/or host device 140. In one example, the authenticator application may include a dot1X application (e.g., a dot1X daemon) that performs authentication protocols using EAP, RADIUS, and/or other authentication protocols. The authenticator application may use a session threshold, obtained from authentication server 130 during an authentication operation associated with client device 120 and/or host device 140. The authenticator application may generate an entry that may be stored, as session information, in a session log when a session with client device 120 and/or host device 140 is initiated. The session log may include, for example, information associated with client device 120 (e.g., a MAC address, an IP address, a device identifier, etc.), a VLAN identifier associated with a VLAN that has been associated with client device 120, the session threshold, a timer associated with the session, and/or other information associated with the session (e.g., a port assignment, quality of service information, etc.). Controller 210 may use the session information to monitor and/or control sessions associated with client device 120 (e.g., and/or host device 140).

I/O unit 220 may include a component or collection of components to receive packets, to process incoming and/or outgoing packets, and/or to transmit outgoing packets. For example, I/O unit 220 may include I/O ports, a packet forwarding engine (PFE), an Ethernet interface and/or another type of interface, a central processing unit (CPU), and/or a memory device. I/O unit 220 may include a collection of ports that receive or transmit packets via physical links. I/O unit 220 may also include packet processing component(s), switch interface component(s), Internet processor component(s), memory device(s), etc.

Each of I/O units 220 may be connected to controller 210 and switch fabric 230. I/O units 220 may receive packet data on physical links connected to a network (e.g., network 150). Each physical link could be one of many types of transport media, such as an optical fiber or an Ethernet cable.

I/O units 220 may process incoming packet data prior to transmitting the data to another I/O unit 220 or the network. I/O units 220 may perform route lookups for the data using the forwarding table from controller 210 to determine destination information. If the destination indicates that the data should be sent out on a physical link, connected to I/O unit 220, then I/O unit 220 may prepare the data for transmission by, for example, adding any necessary headers (e.g., EAP headers, RADIUS headers, etc.) and/or modifying existing headers, and/or transmitting the data from the port associated with the physical link. If the destination indicates that the data should be sent to another I/O unit 220 via switch fabric 230, then I/O unit 220 may, if necessary, prepare the data for transmission to the other I/O unit 220 and/or may send the data to the other I/O unit 220 via switch fabric 230.

Switch fabric 230 may include one or multiple switching planes to facilitate communication among I/O units 220 and/or controller 210. In one implementation, each of the switching planes may include a single-stage switch or a multi-stage switch of crossbar elements. Switch fabric 230 may also, or alternatively, include processors, memories, and/or paths that permit communication among I/O units 220 and/or controller 210.

Although, FIG. 2 illustrates example components of node 110, in other implementations, node 110 may include additional components, fewer components, different components, or differently arranged components than those illustrated in FIG. 2 and described herein. Additionally, or alternatively, one or more operations described as being performed by a particular component of node 110 may be performed by one or more other components, in addition to or instead of the particular component of node 110.

Figure 3:
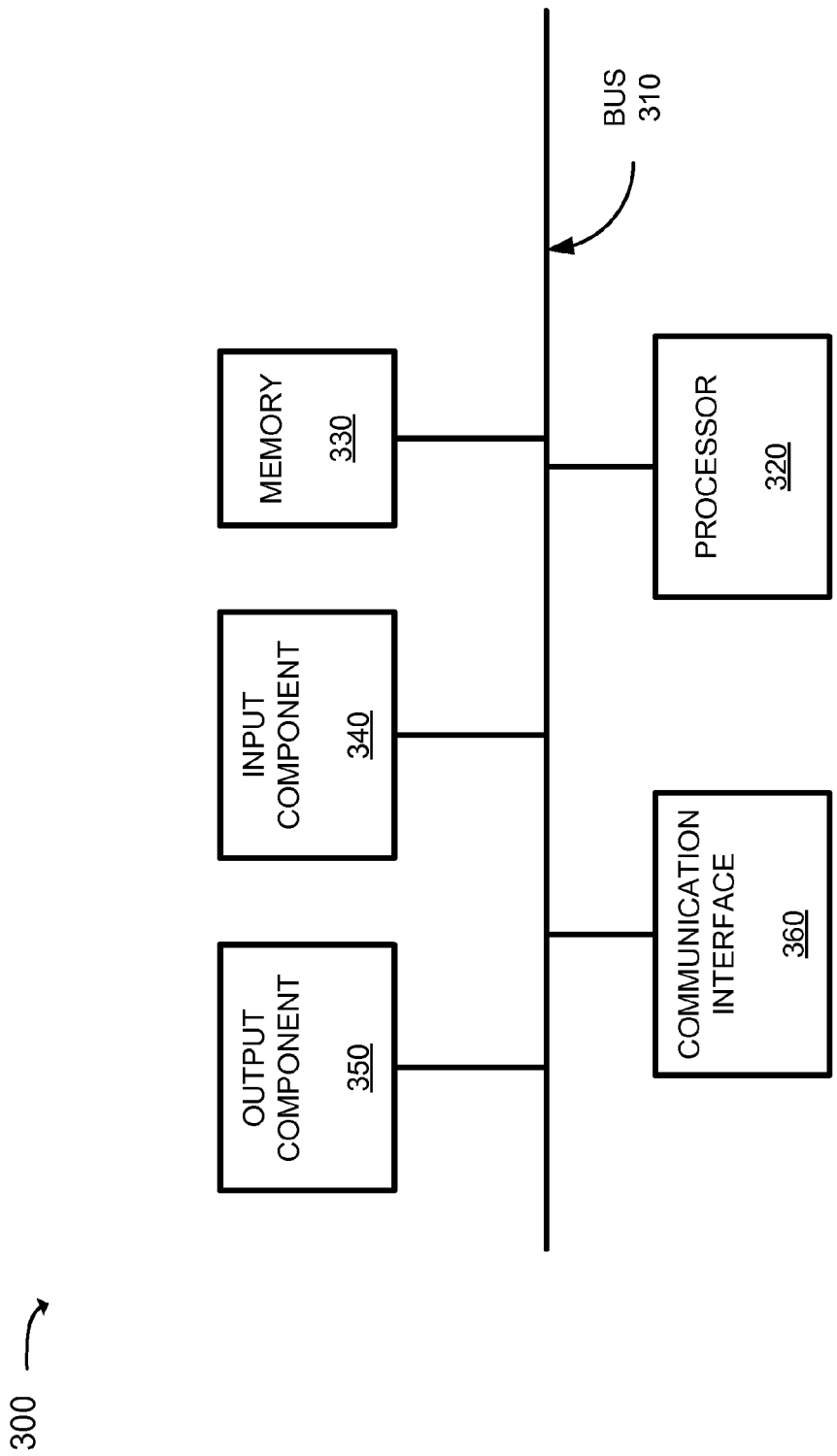
FIG. 3 is a diagram of example components of one or more of the devices of FIG. 1.

FIG. 3 is a diagram of example components of a device 300 that may correspond to client device 120, authentication server 130, and/or host device 140. Device 300 may include a bus 310, a processor 320, a memory 330, an input component 340, an output component 350, and a communication interface 360. Although FIG. 3 shows example components of device 300, in other implementations, device 300 may include fewer components, additional components, different components, or differently arranged components than depicted in FIG. 3. Additionally, or alternatively, in other implementations, one or more components of device 300 may perform one or more tasks described as being performed by one or more other components of device 300.

Bus 310 may include a path that permits communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, a printer, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.) or a combination of wireless and wired communications. For example, communication interface 360 may include mechanisms for communicating with another device or system via a network, such as network 250.

As will be described in detail below, device 300 may perform certain operations relating to preserving an authentication state by maintaining a VLAN association. Device 300 may perform these operations in response to processor 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into memory 330 from another computer-readable medium or from another device. The software instructions contained in memory 330 may cause to processor 320 to perform processes described herein. Alternatively, hardwired circuitry may be used in place of or in combination with software instructions to implement processes described herein. Thus, implementations described herein are not limited to any specific combination of hardware circuitry and software.

EXAMPLE PROCESSES

Figure 4:
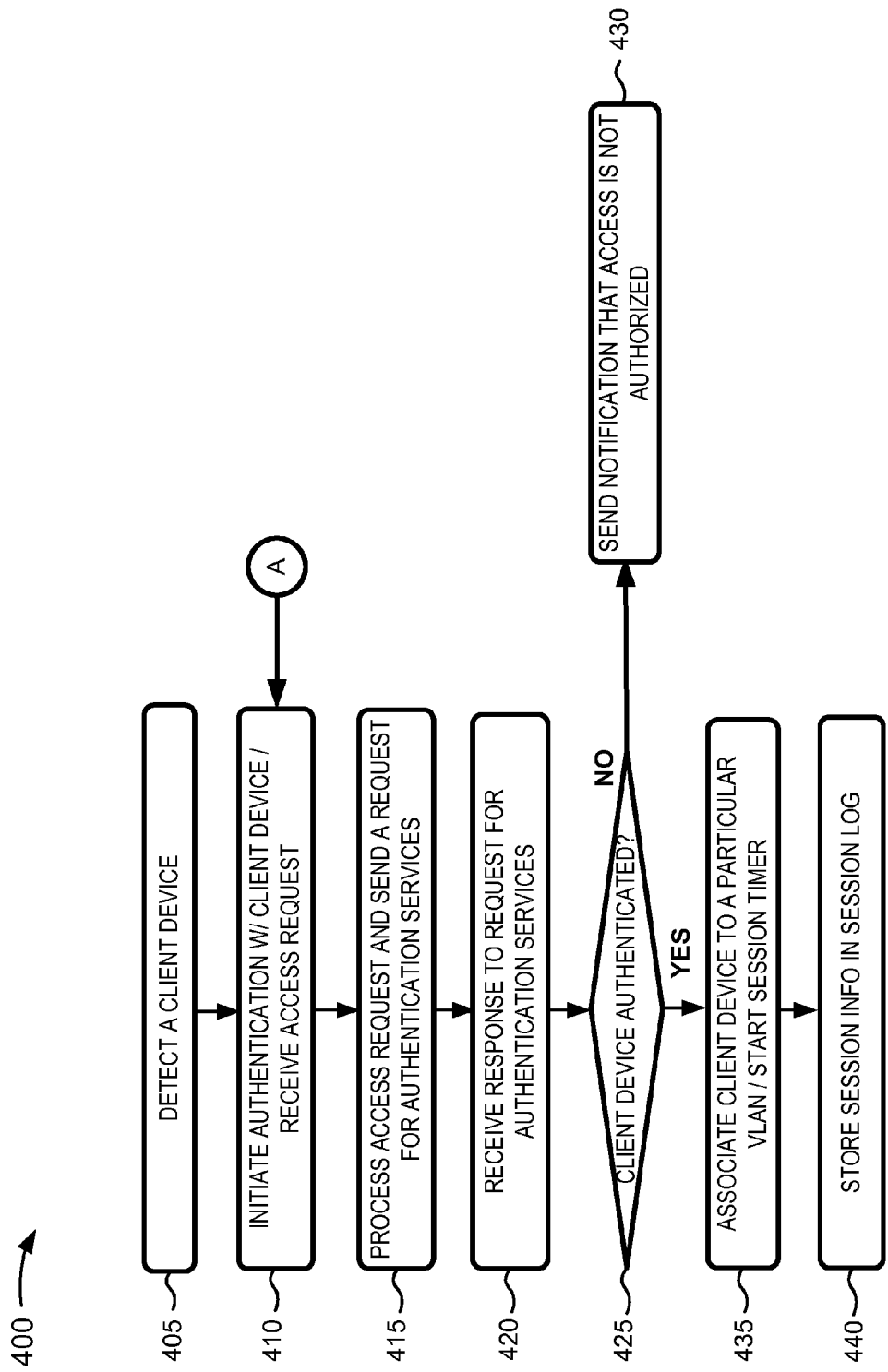
FIG. 4 is a flow chart of an example process for authenticating a client device by associating a virtual local area network (VLAN) and the client device.

FIG. 4 is a flow chart of an example process 400 for authenticating client device 120 by associating a virtual local area network (VLAN) and client device 120. In one example implementation, process 400 may be performed by node 110. In another example implementation, some or all of process 400 may be performed by another device or group of devices instead of or excluding node 110.

As shown in FIG. 4, process 400 may include detecting a client device (block 405). Assume that client device 120 is a passive device (e.g., such as a printer, an appliance, etc.) which generally performs one-way communications (e.g., receives instructions to print information). Assume further that client device 120 has been in an inactive state and/or has been turned off for a period of time. For example, a client device (e.g., client device 120) may be connected to a network (e.g., network 150) and may power up. Client device 120 may, as a result of powering up, send an indication (e.g., a hello packet or series of hello packets, and/or some other indicator), to node 110, that client device 120 is connected to network 150. Node 110 may receive the indication and may detect the presence of client device 120, on network 150, via a particular port (e.g., a port configured to receive dot1X traffic to facilitate authentication functions) associated with node 110.

As also shown in FIG. 4, process 400 may include initiating authentication with client device 120 and receiving an access request (block 410). For example, based on the detection of client device 120, node 110 may send a request for information (e.g., an identity request) to client device 120. In one example, node 110 may send an identity request using an EAP protocol. Client device 120 may receive the identity request (e.g., on a port configured for dot1X traffic) and may send a request for access to node 110. In one example, the request for access may be an identity response, based on the EAP protocol, that includes information associated with client device 120, such as address information (e.g., an IP address, a MAC address, etc.) and/or a device identifier (e.g., a device identifier, an mobile directory number (MDN), a landline directory number (LDN), an international mobile subscriber identity (IMSI), a mobile subscriber integrated services digital network (MSISDN) identifier, a driver identifier, printer device identifier, a vendor identifier, electronic serial number (ESN), a universal integrated circuit card (UICC), etc.). Node 110 may receive the access request and the authenticator application may perform an authentication operation.

As further shown in FIG. 4, process 400 may include processing the access request, sending a request for authentication services (block 415), and receiving a response to the request for authentication services (block 420). For example, node 110 may send an authentication request to authentication server 130 that includes information associated with client device 120. The authentication request may, for example, be sent to authentication server 130 as an access request using a RADIUS protocol that includes encapsulating the access request in a RADIUS packet (e.g. by adding RADIUS headers, labels, trailers, etc. to the access request).

Authentication server 130 may receive the access request and may perform the authentication operation. In one example implementation, authentication server 130 may host a RADIUS application that may process the received access request by removing headers, trailers, labels, etc. associated with the RADIUS protocol. The RADIUS application may compare the information associated with client server 120, received in the access request, to information associated with client device 120, stored in a memory associated with authentication server 130, to determine whether the received information associated with client device 120 matches the stored information associated with client device 120. If the received information associated with client device 120 does not match the stored information associated with client device 120, then the RADIUS application may send a notification indicating that client device 120 cannot be authenticated and node 110 may receive the notification. If, however, the RADIUS application determines that the received information, associated with client device 120, matches the stored information, associated with client device 120, then authentication server 130 may send a notification indicating that client device 120 has been authenticated and node 110 may receive the notification.

The notification that client device 120 has been authenticated may include a session threshold associated with client device 120. For example, the RADIUS application may include a session threshold that may be used to identify a period of time that a session is to be valid before the session is terminated (e.g., times out). The session threshold may be predetermined via the RADIUS application and/or may be set by a network administrator. In one example, the session threshold may be set such that the session threshold is greater than an fdb threshold associated with node 110. In another example, a session threshold may be specified based on a type of client device 120. For example, if client device 120 is a particular type of passive device (e.g. a printer) that is generally expected to be inactive for a particular period of time, then the session threshold for the printer may be set, such that the session threshold is greater than the particular period of time. In another example, the session threshold may be set based on a time of day, a day of the week, etc.

As still further shown in FIG. 4, if client device 120 is not authenticated (block 425—NO), then process 400 may include sending a notification that access is not authorized (block 430). For example, if node 110 receives a notification that client device 120 cannot be authenticated, then node 110 may send a notification to client device 120 indicating that access to network 150 has been denied. Based on the denial of access, node 110 may not forward packets to client device 120 and/or process packets received from client device 120.

As still further shown in FIG. 4, if client device 120 is authenticated (block 425—YES), then process 400 may include associating client device 120 to a particular VLAN and starting a session timer (block 435). For example, if node 110 receives a notification that client device 120 has been authenticated, then node 110 may bind client device 120 to a particular VLAN by associating information associated with client device 120 with an identifier associated with the particular VLAN. The authenticator application may, in one example, cause a MAC address, associated with client device 120, to be associated with an identifier corresponding to a VLAN for one or more printer devices (e.g., a printer-VLAN). The association of the MAC address with the identifier corresponding to the printer-VLAN may permit node 110 to initiate an authenticated session with client device 120. The authenticated session may enable node 110 to send packets, via the printer-VLAN, to client device 120. Node 110 may start a session timer based on the initiation of the authenticated session.

As also shown in FIG. 4, process 400 may include storing session information in a session log (block 440). For example, node 110 may store session information, associated with an authenticated session with client device 120, in a session log, such as session log 500 of FIG. 5. Node 110 may store the session log in a memory associated with node 110 (e.g., either an internal memory or an external memory or storage device).

Figure 5:
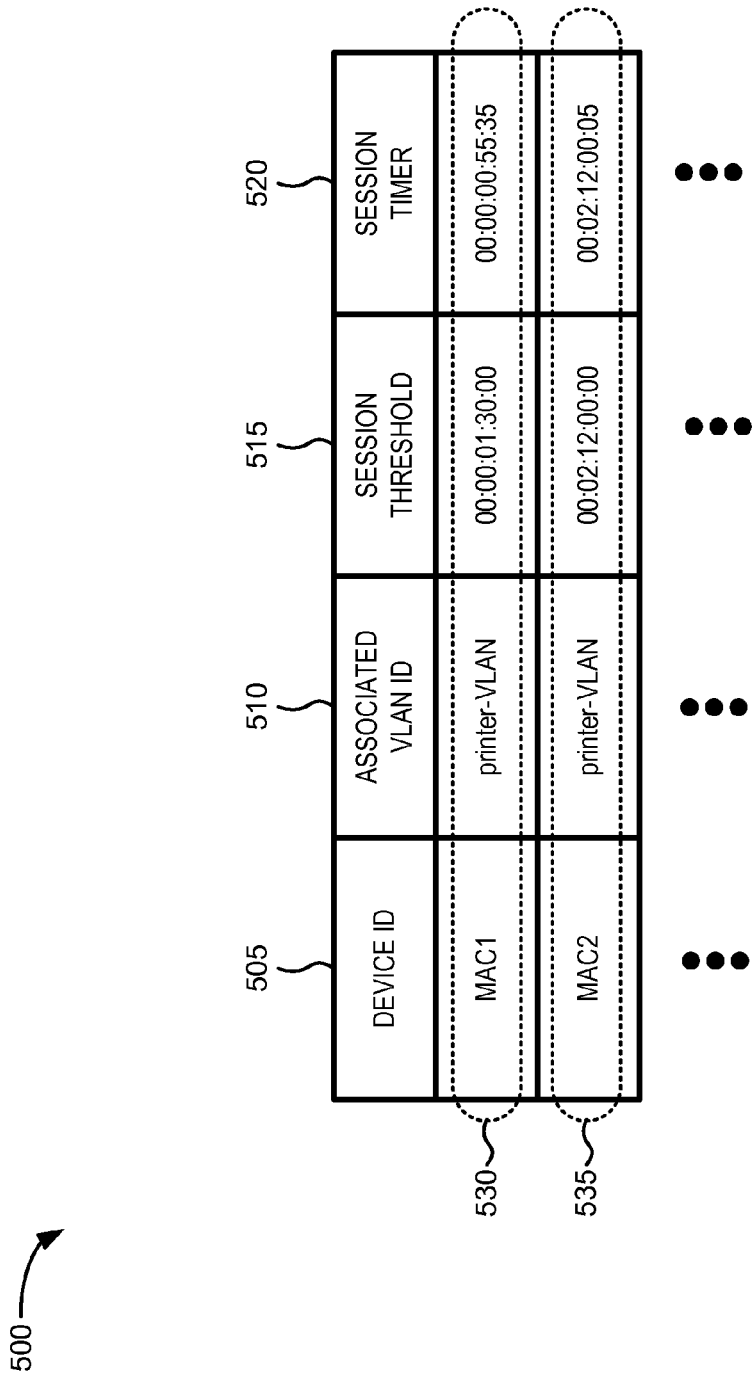
FIG. 5 is a diagram of a session log associated with a VLAN hosted by a client device.

FIG. 5 is a diagram of session log 500, associated with a VLAN, hosted by node 110. As illustrated in FIG. 5, session log 500 may include a collection of fields, such as a device identifier (ID) field 505, an associated VLAN identifier (ID) field 510, a session threshold field 515, a session timer field 520, and/or other fields not shown in FIG. 5 (e.g., a port identifier (ID) field, a quality of service (QoS) field, a session state field, etc.). Session log 500 includes fields 505-520 for explanatory purposes. In practice, session log 500 may include additional fields, fewer fields, different fields, and/or differently arranged fields than are described with respect to session log 500.

Device ID field 505 may store information associated with client device 120. For example, the authenticator application may store address information (e.g., a MAC address, an IP address, etc.) and/or an identifier (e.g., a device identifier, etc.), associated with client device 120, in device ID field 505. Associated VLAN ID field 510 may store an identifier for a particular VLAN that was associated with client device 120 as a result of authenticating client device 120. For example, the authenticator application may store an identifier for a particular VLAN (e.g., a printer-VLAN) that has been associated with a particular client device 120 (e.g., a printer device). Session threshold field 515 may store a time period (e.g., in weeks (ww):days (dd):hours (hh):minutes (mm):seconds (ss), and/or some other time format) after which a session with client device 120 may be terminated (e.g., timed out) if client device 120 remains idle and/or inactive for a period of time that is greater than the session threshold. For example, the authenticator application may obtain the session threshold, from the authentication server 130, when node 110 receives a notification that client device 120 has been authenticated. Session timer field 520 may store an elapsed time (e.g., in weeks (ww):days (dd):hours (hh):minutes (mm):seconds (ss), and/or some other time format) associated with a session with client device 120. For example, the authenticator application may store an elapse time, from a point in time when the session is initiated (e.g., when the client device 120 is associated with the particular VLAN) to a current time.

FIG. 6 is a flow chart of an example process 600 for processing traffic based on whether an association between a VLAN and client device 120 is to be maintained. In one example implementation, process 600 may be performed by node 110. In another example implementation, some or all of process 600 may be performed by another device or group of devices instead of or excluding node 110.

As shown in FIG. 6, process 600 may include checking a session log to determine whether a session is authorized (block 610). Assume that client device 120 has been authenticated in a manner similar to that described above (e.g., with respect to FIG. 4), at a prior point in time. For example, the authenticator application may retrieve a session log, associated with a particular VLAN (e.g., session log 500 of FIG. 5), to monitor and/or control a session associated with client device 120. The authenticator application may, for example, check the session logs periodically (e.g., every 5 minutes, 10 minutes, 30 minutes, 1 hours, 12 hours, etc.). In another example, the authenticator application may check the session log upon the occurrence of some event, such as when packets are received (e.g., from host device 140) that are destined for client device 120, when packets are received from client device 120, and/or upon the occurrence of some other event. In yet another example, the authenticator application may check the session log at a particular time of day as predetermined by the authenticator application or as set by a network administrator.

The authenticator application may, for example, retrieve the session log from a memory associated with node 110. The authenticator application may compare a session time to a session threshold to determine whether the session timer is greater than the session threshold. For example, as shown by ellipse 530 (of FIG. 5), for a particular client device 120 (e.g., a client device 120 associated with a particular MAC address, such as MAC1) and/or an associated VLAN ID (e.g., printer-VLAN), client device 120 may compare a session timer (e.g., 00:00:00:55:35) to a session threshold (e.g., 00:00:01:30:00) to determine whether the session timer is greater than the session threshold.

In another example, as shown by ellipse 535 (of FIG. 5), for a another client device 120 (e.g., a client device 120 associated with a another MAC address, such as MAC2) and/or an associated VLAN ID (e.g., printer-VLAN), client device 120 may compare a session timer (e.g., 00:02:12:00:05) to a session threshold (e.g., 00:02:12:00:00) to determine whether the session timer is greater than the session threshold.

In another example implantation, the session log may include a particular time period during which a session is authorized. For example, the particular time period may be specified by a session threshold for a certain time of day, certain days of the week, etc., as specified by a network administrator. In one example, a session threshold may have a particular value during a period of time (e.g., during business hours) and another threshold during another period of time (e.g., non-business hours, overnight, weekends, etc.).

As also shown in FIG. 6, if a session is authorized (block 620—YES), then process 600 may include permitting traffic to be sent, via a VLAN, to client device 120 (block 630). For example, if the authenticator application determines that the session timer is not greater than the session threshold, then the authenticator application may maintain an association between client device 120 and a particular VLAN. In one example, the authenticator application may determine that the session timer (e.g., 00:00:00:55:35), associated with a session with client device 120, is less than a session threshold (e.g., 00:00:01:30:00) as shown by ellipse 530 of FIG. 5. Based on the determination, the authenticator application may maintain the association between the information associated with client device 120 (e.g., MAC1) and the identifier associated with the particular VLAN (e.g., printer-VLAN). Maintaining the association may enable node 110 to permit traffic to flow to and/or from client 120 via the particular VLAN. In another example implementation, the authenticator application may determine that the session is authorized when the current time (e.g., a time of day, a day of the week, etc.) is an authorized time to maintain a session as specified in the session log (e.g., by a network administrator).

As further shown in FIG. 6, process 600 may include resetting a session timer and/or updating a session log (block 640). For example, the authenticator application may determine that a session, with client device 120, is authorized (e.g., has not timed out based on the session time and/or the session threshold) and may process traffic received from and/or destined for client device 120. Based on the processing of the traffic, the authenticator device may, for example, reset the session timer (e.g., to zero and/or some other threshold) and/or may update the session log (e.g., based on the reset timer).

As also shown in FIG. 6, if a session is not authorized (block 620—NO), then process 600 may include disassociating a VLAN and client device 120, updating a session log (block 650), and/or re-authenticating client device 120. For example, if the authenticator application determines that the session timer is greater than the session threshold, then the authenticator application may terminate the association between client device 120 and a particular VLAN. The session timer may be greater than the session threshold when client device 120 has not received any traffic and/or has not transmitted any traffic for an extended period of time (e.g., approximately equal to the session timer). In one example, the authenticator application may determine that the session timer (e.g., 00:02:12:00:05), associated with a session with client device 120, is greater than a session threshold (e.g., 00:02:12:00:00) as shown by ellipse 535 of FIG. 5. Based on the determination, the authenticator application may terminate the association between the information associated with client device 120 (e.g., MAC2) and the identifier associated with the particular VLAN (e.g., printer-VLAN) to be terminated. Terminating the association may render node 110 unable to process traffic flowing to and/or from client 120 via the particular VLAN. Additionally, or alternatively, the authenticator application may remove entries (e.g., associated with the session) from the session log when the session is terminated.

In another example implementation, the authenticator application may determine that the session is not authorized when the current time (e.g., a time of day, a day of the week, etc.) is not an authorized time to maintain a session as specified in the session log (e.g., by a network administrator).

Based on the determination that the session is not authorized, the authenticator application may cause an authentication operation, on client device 120, to be performed in a manner similar to that described above (e.g., with respect to blocks 410-440 of FIG. 4).

CONCLUSION

An implementation described herein may include systems and/or methods for preserving an authenticated session with a client device by maintaining an association between a virtual local area network (VLAN), hosted by a network node, and the client device with which the network node is interconnected. The systems and/or methods may cause a VLAN-client device association to be maintained even though a client device (e.g., such as a printer, a scanner, a laptop computer, etc.) has been idle and/or inactive for a period of time that exceeds a threshold maintained by the network node hardware and/or embedded software, such as a forwarding database (fdb) entry threshold. The systems and/or methods may use a different session threshold to determine whether a session has timed out. The systems and/or methods may communicate with an authentication server to authenticate the client device and may receive a session threshold from the authentication server that performs the authentication, where the session threshold is greater than the fdb threshold. The systems and/or methods may use the session threshold to determine when the session with the client device has timed out and/or when to terminate the VLAN-client device association. For example, when the client device remains inactive for a period of time that is greater than the fdb threshold, the systems and/or methods may maintain the VLAN-client device association, which permits the session with the client device to continue. When the client device remains inactive for a period of time that exceeds the session threshold, the systems and/or methods may end the session with the client device by terminating the VLAN-client device association.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 4 and 6, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   detecting, by a network node, a presence of a first server device on a network associated with the network node;
   communicating, by the network node, with the first server device to obtain information associated with the first server device;
   sending, by the network node and to a second server device, a request for authentication services,
      the request including the information associated with the first server device;

receiving, by the network node and from the second server device, a notification that the first server device has been authenticated,
the notification including a session threshold associated with the authentication,
the session threshold including a period of time during which a session with a particular type of server device is authorized; and
establishing, by the network node and based on the notification, a session with the first server device,
the establishing the session including:
associating the information associated with the first server device with an identifier associated with a virtual local area network (VLAN), associated with the network node,
the associating permitting network traffic to be received from or sent to the first server device via the VLAN, and
storing, as session information and in a memory associated with the network node, at least one of:
the information associated with the first server device,
the session threshold, or
the identifier associated with the VLAN,
the network node using the session threshold, instead of a threshold associated with the VLAN, to determine a duration permitted for the session;
checking, at a later point in time, the session information stored in the memory;
determining whether the first server device is the particular type of server device based on the information associated with the first server device and the session threshold;
disassociating the first server device and the VLAN when the first server device is not the particular type of server device; and
maintaining an association between the first server device and the VLAN when the first server device is the particular type of server device and the later point in time is within the period of time.

2. The method of claim 1, where the session threshold is based on an Institute of Electrical and Electronics Engineers (IEEE) 802.1x authentication protocol.

3. The method of claim 1, further comprising:
receiving the network traffic, destined for the first server device, from a third server device;
comparing a session time with the session threshold,
the session time being based on a current time and a previous time when the session was established; and
outputting, based on the comparison of the session time and the session threshold, the network traffic to the first server device, via the VLAN, when the session time is less than the session threshold.

4. The method of claim 3, further comprising:
resetting the session time based on the session time being less than the session threshold.

5. The method of claim 3, where comparing the session time with the session threshold includes:
determining that the session time is greater than the session threshold; and
terminating the association between the first server device and the VLAN, based on the session time being greater than the session threshold, where the terminating renders the network node unable to output the network traffic to the first server device via the VLAN.

6. The method of claim 1, where the second server device provides the authentication services or sends the notification using a remote authentication dial-in user service (RADIUS) protocol.

7. The method of claim 1, where the session threshold is based on a type of the particular type of server device.

8. The method of claim 1, where establishing the session further includes starting a session timer after associating the information associated with the first server device with the identifier associated with the VLAN, and
where the later point in time is based on a start of the session timer.

9. A system comprising:
one or more processors, implemented at least partially in hardware, to:
detect a presence of a first server device on a network associated with the one or more processors;
obtain, from the first server device, information associated with the first server device;
send, to a second server device, a request for authentication services,
the request including the information associated with the first server device;
receive, from the second server device, a notification that the first server device has been authenticated,
the notification including a session threshold associated with the authentication,
the session threshold including a period of time during which a session with a particular type of server device is authorized; and
establish, based on the notification, a session with the first server device,
when establishing the session, the one or more processors being to:
associate the information associated with the first server device with an identifier associated with a virtual local area network (VLAN), associated with the one or more processors,
the associating permitting network traffic to be received from or sent to the first server device via the VLAN, and
store, as session information and in a memory associated with the one or more processors, at least one of:
the information associated with the first server device,
the session threshold, or
the identifier associated with the VLAN,
the one or more processors using the session threshold, instead of a threshold associated with the VLAN, to determine a duration permitted for the session;
check, at a later point in time, the session information stored in the memory;
determine whether the first server device is the particular type of server device based on the information associated with the first server device and the session threshold;
disassociate the first server device and the VLAN when the first server device is not the particular type of server device; and
maintain an association between the first server device and the VLAN when the first server device is the particular type of server device and the later point in time is within the period of time.

10. The system of claim 9, where the session threshold is based on an Institute of Electrical and Electronics Engineers (IEEE) 802.1x authentication protocol.

11. The system of claim 9, where the one or more processors are further to:
receive the network traffic, destined for the first server device, from a third server device;
compare a session time with the session threshold,
the session time being based on a current time and a previous time when the session was established; and
output, based on the comparison of the session time and the session threshold, the network traffic to the first server device, via the VLAN, when the session time is less than the session threshold.

12. The system of claim 11, where the one or more processors are further to:
reset the session time based on the session time being less than the session threshold.

13. The system of claim 11, where, when comparing the session time with the session threshold, the one or more processors are further to:
determine that the session time is greater than the session threshold; and
terminate the association between the first server device and the VLAN, based on the session time being greater than the session threshold,
the terminating rendering the one or more processors unable to output the network traffic to the first server device via the VLAN.

14. The system of claim 9, where the session threshold is based on a type of the particular type of server device.

15. The system of claim 9, where, when establishing the session, the one or more processors are further to start a session timer after associating the information associated with the first server device with the identifier associated with the VLAN, and
where the later point in time is based on a start of the session timer.

16. A non-transitory computer-readable medium storing instructions, the instructions comprising:
one or more instructions that, when executed by one or more processors, cause the one or more processors to:
detect a presence of a first server device on a network associated with the one or more processors;
obtain, from the first server device, information associated with the first server device;
send, to a second server device, a request for authentication services,
the request including the information associated with the first server device;
receive, from the second server device, a notification that the first server device has been authenticated,
the notification including a session threshold associated with the authentication,
the session threshold including a period of time during which a session with a particular type of server device is authorized; and
establish, based on the notification, a session with the first server device,
the one or more instructions that cause the one or more processors to establish the session including:
one or more instructions that cause the one or more processors to:
associate the information associated with the first server device with an identifier associated with a virtual local area network (VLAN), associated with the one or more processors,
the associating permitting network traffic to be received from or sent to the first server device via the VLAN, and
store, as session information and in a memory associated with the one or more processors, at least one of:
the information associated with the first server device,
the session threshold, or
the identifier associated with the VLAN,
the one or more processors using the session threshold, instead of a threshold associated with the VLAN, to determine a duration permitted for the session,
check, at a later point in time, the session information stored in the memory;
determine whether the first server device is the particular type of server device based on the information associated with the first server device and the session threshold;
disassociate the first server device and the VLAN when the first server device is not the particular type of server device; and
maintain an association between the first server device and the VLAN when the first server device is the particular type of server device and the later point in time is within the period of time.

17. The computer-readable medium of claim 16, where the session threshold is based on an Institute of Electrical and Electronics Engineers (IEEE) 802.1x authentication protocol.

18. The computer-readable medium of claim 16, where the instructions further comprise:
one or more instructions that cause the one or more processors to:
receive the network traffic, destined for the first server device, from a third server device;
compare a session time with the session threshold,
the session time being based on a current time and a previous time when the session was established; and
output, based on the comparison of the session time and the session threshold, the network traffic to the first server device, via the VLAN, when the session time is less than the session threshold.

19. The computer-readable medium of claim 18, where the one or more instructions that cause the one or more processors to compare the session time with the session threshold further include:
one or more instructions that cause the one or more processors to:
determine that the session time is greater than the session threshold; and
terminate the association between the first server device and the VLAN, when the session time is greater than the session threshold,
the terminating rendering the one or more processors unable to output the network traffic to the first server device via the VLAN.

20. The computer-readable medium of claim 16, where the session threshold is based on a type of the particular type of server device.

21. The computer-readable medium of claim 16, where the one or more instructions that cause the one or more processors to establish the session include one or more instructions that cause the one or more processors to start a session timer after associating the information associated with the first server device with the identifier associated with the VLAN, and
where the later point in time is based on a start of the session timer.

* * * * *